United States Patent [19]

Inoue et al.

[11] Patent Number: 5,613,326
[45] Date of Patent: Mar. 25, 1997

[54] SEALING STRIP FOR CONVERTIBLE

[75] Inventors: Satoshi Inoue; Yasuyuki Fujita; Takeo Kawazoe, all of Hiroshima, Japan

[73] Assignee: Nishikawa Rubber Co., Ltd., Hiroshima-ken, Japan

[21] Appl. No.: 556,741

[22] Filed: Nov. 7, 1995

[51] Int. Cl.$^6$ ..................................................... E06B 7/16
[52] U.S. Cl. ........................ 49/476.1; 49/479.1; 49/498.1
[58] Field of Search ............................... 49/476.1, 479.1, 49/498.1

[56] References Cited

U.S. PATENT DOCUMENTS

| | | | |
|---|---|---|---|
| 4,817,336 | 4/1989 | Kisanuki | 49/476.1 |
| 4,827,670 | 5/1989 | Kogiso et al. | 49/476.1 |
| 4,928,431 | 5/1990 | Kuzuhara et al. | 49/498.1 X |
| 5,106,149 | 4/1992 | Glossop, Jr. et al. | 49/476.1 X |
| 5,209,546 | 5/1993 | Hasegawa et al. | 49/476.1 X |

Primary Examiner—Philip C. Kannan
Attorney, Agent, or Firm—Flynn, Thiel, Boutell & Tanis, P.C.

[57] ABSTRACT

A sealing strip for use on a convertible to seal the joint between the front pillar and the window glass of a front door integrally comprising: an extruded section having a longitudinal groove, a hollow upper sealing part formed on one side of the groove, a hollow lower sealing part formed on the other side of the groove, and a bridge interconnecting the upper sealing part and the lower sealing part; a molded section continuous with the extruded section, having an external shape substantially the same as that of the extruded section, and integrally having a longitudinal center groove, a hollow part having a hollow upper sealing part formed on one side of the center groove, and a hollow lower sealing part formed on the other side of the center groove and provided with a lip, and a bridge formed at least in a range in the hollow part so as to interconnect a portion of the upper sealing part and a corresponding portion of the lower sealing part.

8 Claims, 3 Drawing Sheets

5,613,326

SEALING STRIP FOR CONVERTIBLE

BACKGROUND OF THE INVENTION

1. Field of the Invention

The present invention relates to an improved sealing strip to be used for sealing the joint between a portion of the front pillar near the header, and the front door of a convertible.

2. Description of the Related Art

Referring to FIGS. 1 to 3, a conventional sealing strip for a convertible, employed in sealing the joint between a portion of a front pillar 10 contiguous with a header 20, and a front door 40 has an extruded section 11 and a molded section 31. In FIG. 2, a section demarcated by lines between triangles, i.e., a section on the side of solid portions of the triangles, is the molded section 31, a section outside the line between the triangles, i.e., a section on the side of blank portions of the triangles, is the extruded section 11, and another section outside the line between the triangles is a weather strip 21 attached to the header 20. As shown in FIG. 2, the extruded section 11 has a longitudinal center groove 12, a hollow upper sealing part 13 on one side of the center groove 12, a hollow lower sealing part 14 on the other side of the center groove 12, and a bridge 15 interconnecting the upper sealing part 13 and the lower sealing part 14. As shown in FIG. 3, the molded section 31 to be attached to a corner is the same in external shape as the extruded section 11 and has a groove 32 and a lip L. However, the molded section 31 has only a single hollow part 33 and is not provided with any bridge. When the upper sealing portion S of the hollow part 33 of the molded section 31 of this sealing strip is deformed elastically by the front door 40, the lower lip L is bent accordingly, so that the front door sealing effect of the lip L is nullified. Although a pad 36 is inserted in a lower space of the hollow part 33 to avoid the undesirable bending of the lip L, the effect of the pad 36 is not necessarily satisfactory, and there is the possibility that the pad 36 obstruct draining the water collected in the groove 22 of the weather strip 21 attached to the header 20 through a drain hole 7 into the hollow lower sealing part 14. Therefore, the pad 36 must be formed in a particular shape, which increases the cost of the sealing strip and causes problems in the quality of the sealing strip.

SUMMARY OF THE INVENTION

Accordingly, it is an object of the present invention to provide a sealing strip to be attached to the header of a convertible, integrally comprising an extruded section having a longitudinal center groove, a hollow upper sealing part formed on one side of the center groove, a hollow lower sealing part formed on the other side of the center groove, and a bridge 15 interconnecting the upper sealing part and the lower sealing part, and a molded section continuous with the extruded section, having substantially the same external shape as that of the extruded section, and integrally comprising a bridge, a hollow upper part formed on one side of the bridge, and a hollow lower part formed on the other side of the bridge and provided with a lip.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENT

Figure 1:
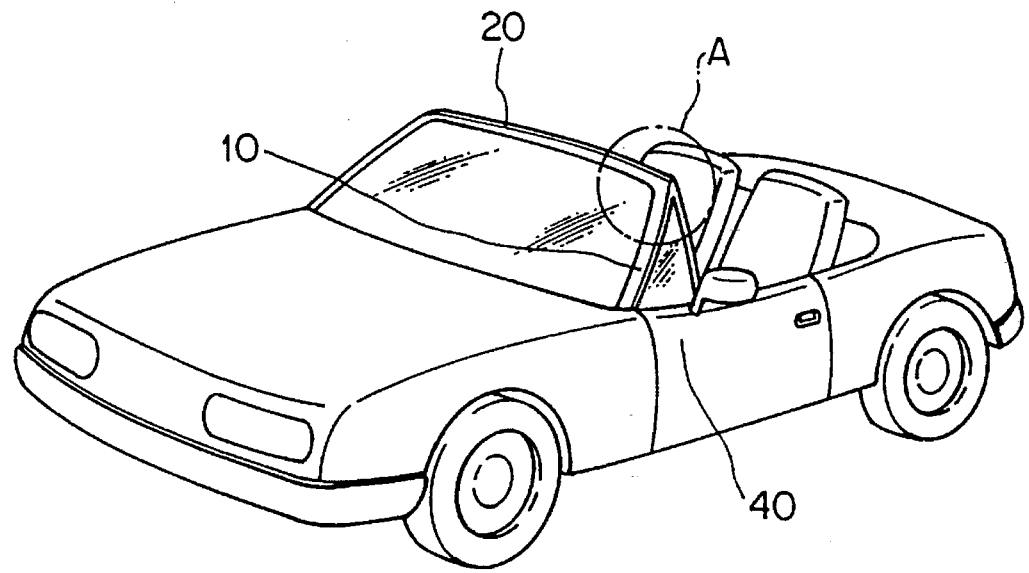
FIG. 1 is a perspective view of a convertible.
Figure 2:
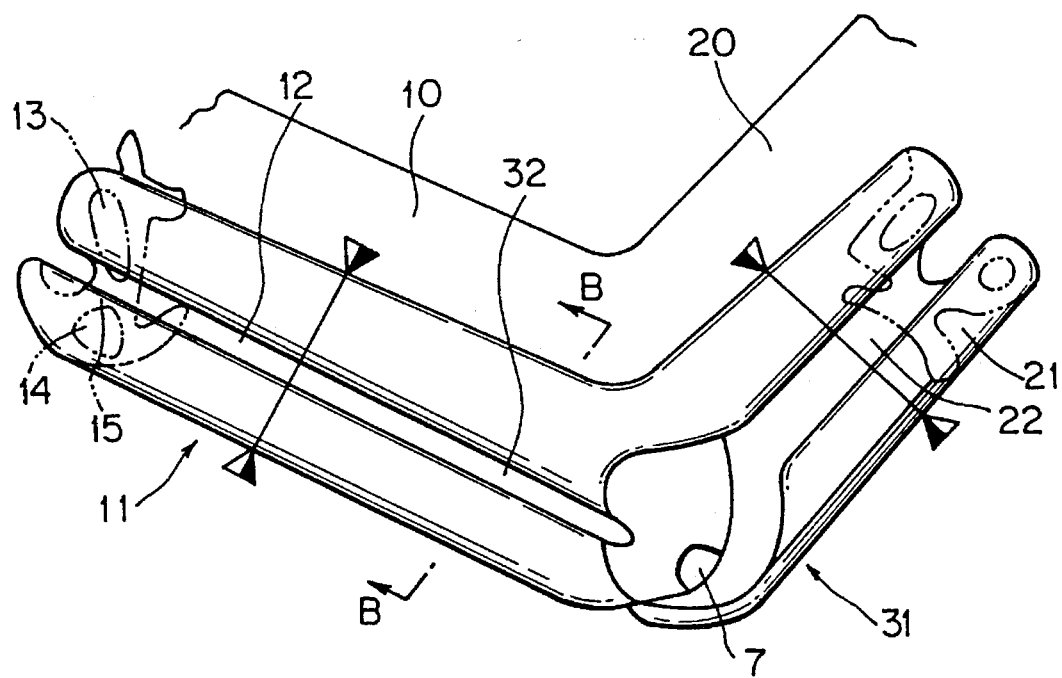
FIG. 2 is an enlarged perspective view of a portion A of a conventional sealing strip in FIG. 1.
Figure 3:
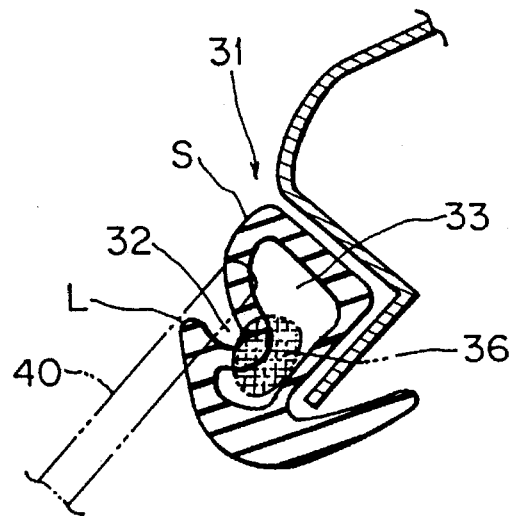
FIG. 3 is a sectional view taken on the line B—B in FIG. 2.
Figure 4:
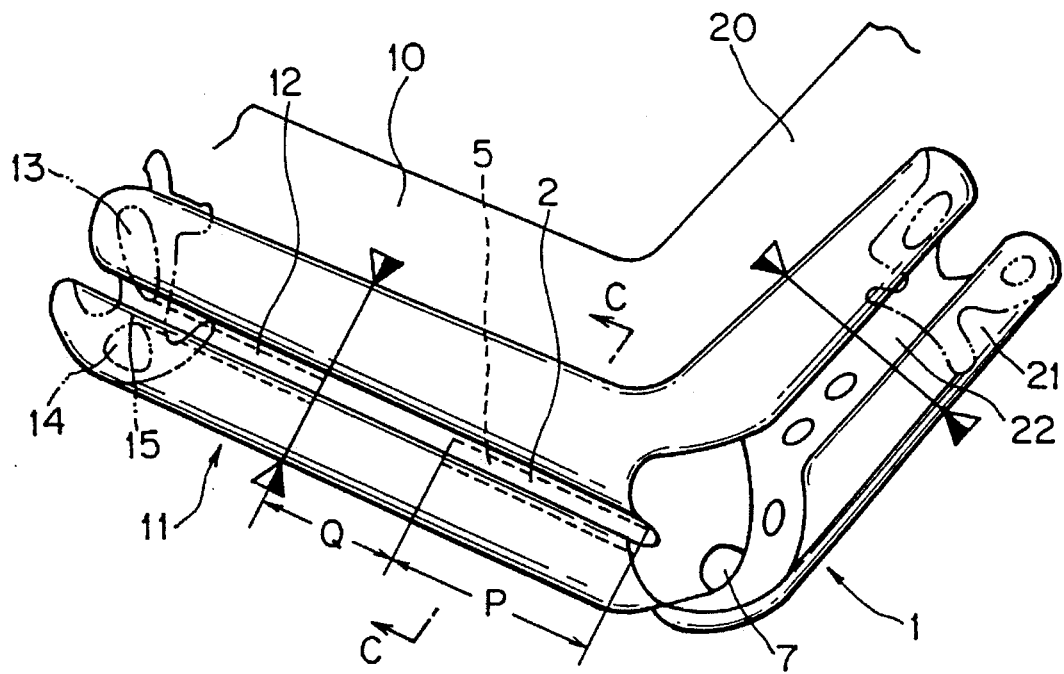
FIG. 4 is an enlarged perspective view, similar to FIG. 2, of a sealing strip in a preferred embodiment according to the present invention.
Figure 5:
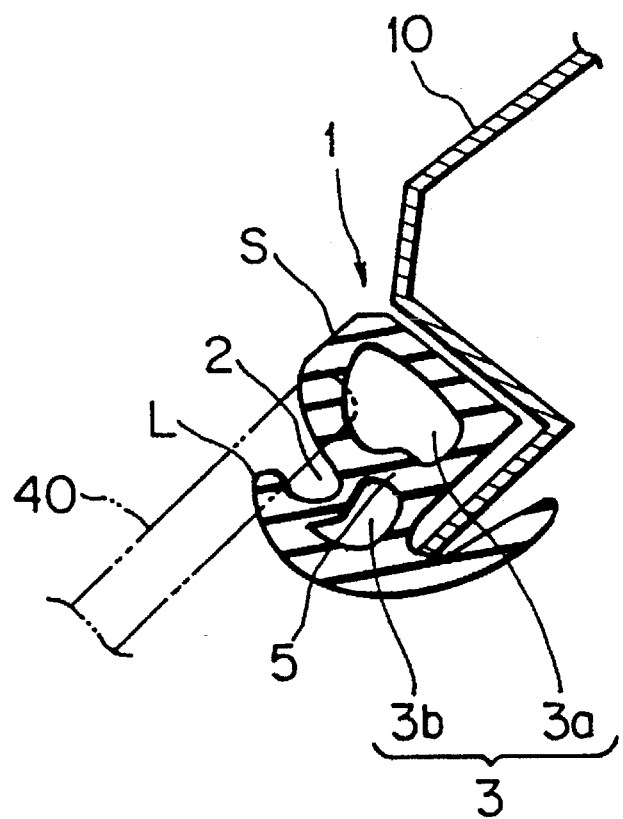
FIG. 5 is a Sectional view taken on the line C—C in FIG. 4.

A sealing strip for a convertible is attached to a portion of a front pillar 10 contiguous with a header 20 to seal the joint between the front pillar 10 and the window glass of a front door 40. The sealing strip comprises integrally an extruded section 11 and a molded section 1. The extruded section 11 has a longitudinal groove 12, a hollow upper sealing part 13 formed on one side of the groove 12, a hollow lower sealing part 14 formed on the other side of the groove 12, and a bridge 15 interconnecting the upper sealing part 13 and the lower sealing part 14. As best shown in FIG. 5, the molded section 1 continuous with the extruded section 11 has an external shape substantially the same as that of the extruded section 11, and integrally comprises a longitudinal center groove 2, a hollow part 3 having a hollow upper sealing part 3a formed on one side of the center groove 2, and a hollow lower sealing part 3b formed on the other side of the center groove 2 and provided with a lip L, and a bridge 5 formed at least in a range P (FIG. 4) of the hollow part 3 so as to interconnect a portion of the upper sealing part 3a and a corresponding portion of the lower sealing part 3b. A drain hole 7 is formed on the lower portion of the closed upper end portion of the sealing strip under the center groove 2 so as to communicate with the interior of the hollow lower part 3b. The bridge 5 is formed only in the range P and is not formed in a range Q to facilitate the extraction of a core from the molded section 1 after molding.

When the sealing strip is pressed elastically against the window glass of the front door 40, the elastic deformation of the sealing portion of the upper sealing part 3a is not transmitted to the lip L of the lower sealing part 3b, so that the sealing effect of the lip L is not affected by the elastic deformation of the sealing portion S of the upper sealing part 3a. Since the sealing strip is not provided with any internal pad, the water collected in the groove 22 of the header 20 can be smoothly drained through the drain hole 7 into the lower sealing part 3b.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A sealing strip for a convertible which is adapted to be attached to a portion of a front pillar of the convertible that is contiguous with a header of the convertible to seal the joint between the front pillar and a window glass of a front door, said sealing strip integrally comprising: an extruded section having a longitudinal groove, a hollow upper sealing part formed on one side of the groove, a hollow lower sealing part formed on the other side of the groove, and a first bridge interconnecting the upper sealing part and the lower sealing part; and a molded section which is continuous with the extruded section and has an external shape substantially the same as that of the extruded section, said molded section having first and second elongate seal sections defining an L-shape, said first seal section being joined to said extruded section and integrally having a longitudinal center groove, a hollow part which extends longitudinally and has a hollow upper sealing part formed on one side of the center groove for sealing contact with a window glass of a car door and a hollow lower sealing part formed on the other side of the center groove, said hollow lower sealing part provided with a lip which projects outwardly for sealing contact with said window glass, said molded section further including a second bridge formed at least partially along the length of the hollow part so as to interconnect a portion of the upper sealing part and a corresponding portion of the lower sealing part, said first seal section having an open end portion which is joined to said extruded section in communication therewith and a closed end portion substantially closing said upper and lower sealing parts, a drain hole for receiving rainwater from said second seal section being formed on a lower portion of the closed end portion of the sealing strip on one side of the center groove so as to communicate with the interior of the hollow lower sealing part of said molded section, said first bridge and said second bridge being longitudinally aligned such that said upper and lower sealing parts of said molded section are disposed in communication with said upper and lower sealing parts of said extruded section respectively whereby rainwater is flowable through said drain hole and said lower sealing parts of said extruded section and said molded section.

2. A sealing strip for a convertible according to claim 1, wherein said second bridge of said molded section extends from said closed end portion and partially along a length of said molded section and terminates a spaced distance from said open end portion, said second bridge being disposed adjacent said lip to provide support thereto.

3. A sealing strip mounted to a car which includes a substantially horizontal header extending sidewardly along an upper edge of a car windshield, and a first pillar extending downwardly from said header which is engagable with an edge region of a closed door, said sealing strip integrally comprising:

a first extruded weather strip which is attached to said header and includes a longitudinally extending groove for receiving rainwater therein;

a second extruded weather strip which is secured to said front pillar and includes a longitudinal groove, a first extruded sealing part which is hollow and formed on one side of said groove, a second extruded sealing part which is hollow and formed on the other side of said groove, and a first bridge wall interconnecting said first extruded sealing part and said second extruding sealing part, said first and second extruded sealing parts being open at an upper end of said second extruded weather strip; and a substantially L-shaped molded weather strip having a first elongate seal section extending sidewardly and a second elongate seal section extending downwardly from said first seal section, said molded weather strip being connected between said first and second extruded weather strips to define an L-shape for said sealing strip, said first seal section being integrally joined to said first weather strip and including a recess therealong, said recess being aligned with said groove to receive rainwater flowing therefrom and extending sidewardly to an upper end of said second seal section, said second seal section defining a longitudinal center groove and a hollow interior part which extends downwardly and is substantially enclosed at said upper end, said hollow interior part including a first molded sealing part and a second molded sealing part which extend longitudinally in a generally parallel relation and are separated one from the other by a second bridge wall disposed therebetween, said first and second molded sealing parts being elastically deformable and disposed for sealing contact with said edge region of said closed door, said upper end of said second seal section including a drain passage formed therethrough which is in communication with said first molded sealing part and said recess for receiving said rainwater from said recess which is flowable into said first molded sealing part.

4. A sealing strip according to claim 3, wherein said second sealing part includes a lip which projects outwardly in the region of said second bridge wall of said molded weather strip such that said second bridge wall prevents transmission of the elastic deformation of said first molded sealing part to said lip.

5. A sealing strip according to claim 3, wherein said bridge wall of said molded weather strip extends downwardly from said upper end of said second section and terminates in the region between said upper end and an open lower end of said second section to which said second extruded section is joined.

6. A sealing strip according to claim 3, wherein said second bridge wall is disposed upwardly of said first bridge wall in alignment therewith such that said hollow first and second extruded sealing parts are aligned in communication with said hollow first and second molded sealing parts, said rainwater being flowable downwardly from said first molded sealing part to said second extruded sealing part.

7. A sealing strip mounted to a car which includes a substantially horizontal header extending sidewardly along an upper edge of a car windshield, and a first pillar extending downwardly from said header which is engagable with an edge region of a closed door, said sealing strip integrally comprising:

a horizontal extruded weather strip which is attached to said header and includes a longitudinally extending horizontal groove for receiving rainwater therein;

an upright extruded weather strip which is secured to said front pillar and includes a longitudinal upwardly extending groove, a first extruded sealing part which is hollow and formed on one side of said groove for sealing engagement with said edge region of said closed door, a second extruded sealing part which is hollow and formed on the other side of said groove for sealing engagement with said edge region of said closed door, and a first bridge wall interconnecting said first and second extruded sealing parts, said first and second extruded sealing parts being open at an upper end of said second extruded weather strip; and a substantially L-shaped molded weather strip having a horizontal first seal section extending sidewardly and a second seal section extending downwardly from said first seal section, said molded weather strip being connected between said horizontal and upright extruded weather strips to define an L-shape for said sealing strip, said first seal section being integrally joined to said horizontal weather strip and including a recess therealong which is aligned with said horizontal groove to receive rainwater flowing therefrom and extending sidewardly to an upper end of said second seal section, said second section defining a longitudinal center groove and a hollow interior part which extends downwardly and is substantially enclosed at said upper end, said hollow interior part including a first molded sealing part and a second molded sealing part which extend longitudinally in a generally parallel relation and are separated one from the other by a second bridge wall disposed therebetween, said first molded sealing part being elastically deformable and disposed for sealing contact with said edge region of said closed door, said second molded sealing part being elastically deformable and including an outwardly projecting lip therealong which is disposed for sealing contact with said edge region of said closed door, said lip projecting outwardly in the region of said second bridge wall such that said bridge wall provides support thereto to prevent transmission of the elastic deformation of said first molded sealing part to said lip, said enclosed upper end including a drain passage formed therethrough which is in communication with said first molded sealing part and said recess for receiving said rainwater therefrom which is flowable into said first molded sealing part.

8. A sealing strip according to claim 7, wherein said second bridge wall extends downwardly from said upper end section and terminates in the region intermediate said closed upper end and an open lower end of said second seal section to which said upright extruded weather strip is joined, said second bridge wall of said molded section being aligned upwardly of said first bridge wall of said upright extruded weather strip such that said first and second extruded sealing parts are upwardly aligned in communication with said first and second molded sealing parts, said rainwater being flowable downwardly from said first molded sealing part to said first extruded sealing part.

* * * * *